July 29, 1958  E. V. KALLSTROM  2,845,284
HEAT EXCHANGER COUPLING UTILIZING BOTH A LOCK AND A LAP SEAM
Filed Sept. 17, 1953

Inventor:
Einar V. Kallstrom
By: Lee & Lee
Attys

United States Patent Office 2,845,284
Patented July 29, 1958

2,845,284

HEAT EXCHANGER COUPLING UTILIZING BOTH A LOCK AND A LAP SEAM

Einar V. Kallstrom, Racine, Wis., assignor to Modine Manufacturing Company, Racine, Wis., a corporation of Wisconsin Application September 17, 1953, Serial No. 380,857

2 Claims. (Cl. 285—192)

The invention relates generally to a seamed tube and header construction, and more particularly to a novel form of seamed tube and method of making the same.

In the past seamed tube constructions have been used quite extensively in heat exchanger fields, wherein the tube is suitably formed from a strip of sheet material bent or otherwise shaped to form a tubular structure, the longitudinal edges of the strip being secured together by a lock seam which normally comprises a plurality of plies or thicknesses of the material forming the tube, whereby the longitudinal edges of the material are formed with mechanically interlocked U-shaped channel portions. Such tubes are normally employed in conjunction with one or more header members through which the tubes extend and to which they are secured in fluid tight relation. Such securement usually comprises a suitable bonding or brazing material, and as the typical lock seam, which normally is positioned within the tube to provide a uniformly contoured outer tube surface, the external joint of the edges of the strip forming the tube of necessity forms a longitudinally extending depression or channel in the exterior face of the tube and to achieve an efficient leakproof construction it is necessary that the bonding material flow into and completely close such external channel at the juncture of the tube with the header member. As the channel is comparatively large with respect to the other dimensions of the structure, such channel or depression oftentimes is either not completely closed, or if completely closed, in sufficient bonding material is provided to withstand the operating pressures, etc. under which the exchanger structure is utilized, resulting in a relatively high percentage of leaks in tubular exchanger constructions embodying interlocked seamed tubes, and undesirable repair costs.

The present invention therefore has among its objects the production of a novel tube structure in which the undesirable groove or depression formed by the seam structure adjacent the header member is eliminated and the tube may be constructed to closely abut and conform to the configuration of the opening in the header member, with the joint between the longitudinal edges of the strip forming the tube presenting little or no depression to be filled with bonding material, resulting in a tube and header connection which provides maximum effective sealing relation between the tube and header member and eliminating the disadvantages above referred to of prior structures.

Another object of the invention is the utilization of a novel method of forming such a tube and header assembly which insures an efficient joint between the header and tube and at the same time is readily adaptable to present manufacturing and production techniques.

A further object of the invention is the production of a novel tube structure utilizing both a lock seam and a lap seam to achieve the desired results.

A further object of the invention is the utilization of a novel method whereby the tube is deformed following its insertion in the header member to insure that the external surface of the tube closely conforms to the periphery of the aperture in the header plate.

Many other objects and advantages of the construction and method herein shown and described will be obvious to those skilled in the art from the disclosure herein given.

To this end my invention consists in the novel construction, arrangement and combination of parts and method herein shown and described, and more particularly pointed out in the claims.

In the drawings, wherein like reference characters indicate like or corresponding parts:

The present invention contemplates the production of a tube from a strip of sheet material which is suitably shaped into tubular form, with the adjoining peripheral edges of the strip being provided with a lock seam of the type commonly used, such lock seam, however, terminating at a point spaced from the end edge of the tube which is to be inserted into the header member. The portion of the tube between such end edge and the termination of the lock seam is so designed that a simple overlap joint is produced in that portion of the tube which is to extend through the header member, such lap joint being constructed to produce a flush surface at opposite sides of the joint, and it will be apreciated that the use of a lap joint adjacent the periphery of the aperture in the header member enables the production of a joint adjacent such periphery having substantially little if any depression which must be filled to insure a leakproof joint.

Figure 1:
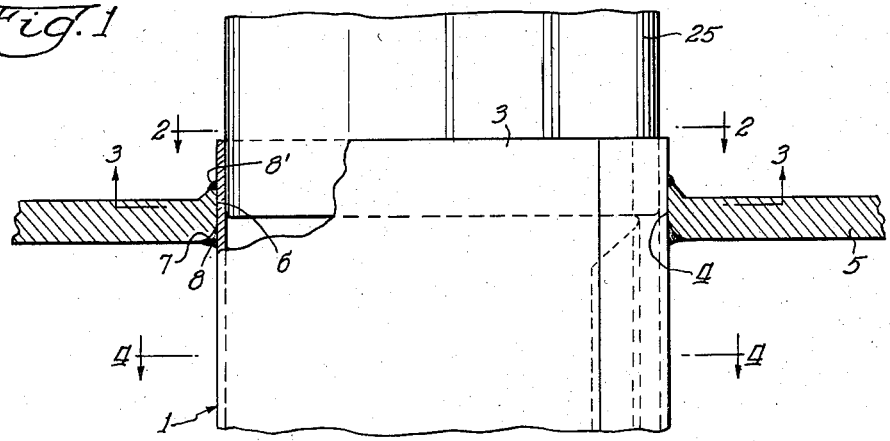
Fig. 1 is a transverse sectional view through a header member with a tube constructed in accordance with the present invention mounted therein.

Referring to the drawings and more particularly to Fig. 1, the reference numeral 1 indicates generally a tube having its upper end 3 extending through an aperture 4 in a header plate or member 5. In the embodiment of the invention illustrated, the header member is deformed adjacent the periphery of the aperture 4 to offset the peripheral edge 6 of the aperture axially outward with respect to the plane of the member 5 in a direction toward the adjacent end 3 of the tube 1, thus forming an annular depression or well 7 about the tube 1. The tube and header member are suitably bonded together by bonding material 8 and 8', the construction illustrated being adapted to be bonded by an operation in which the structure is inverted to that illustrated in Fig. 1, whereby the depression 7 is adapted to accumulate bonding material 8 as illustrated thereby forming a strong, efficient bond between the member 5 and tube 1.

The tube 1 is formed from a suitable strip of sheet material and preferably prior to the tube forming operation, the strip is notched adjacent the junctures to the longitudinal edges 9 and 11 with the end edge 12 at the end 3 of the tube, such notches being indiacted generally by the numerals 13 and 14. In the embodiment of the invention illustrated, the longitudinal edges 15 of the respective notches extend parallel to the edges 9 and 11, while the transverse edges 16 of the notches extend angularly rearward with respect to the end edge 12 of the strip.

Figure 4:
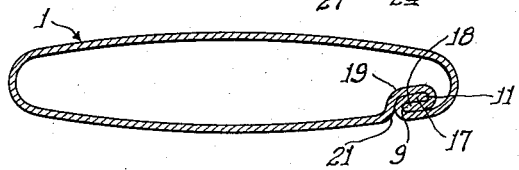
Fig. 4 is a sectional view of the tube taken approximately on the line 4—4 of Fig. 1.
Figure 5:
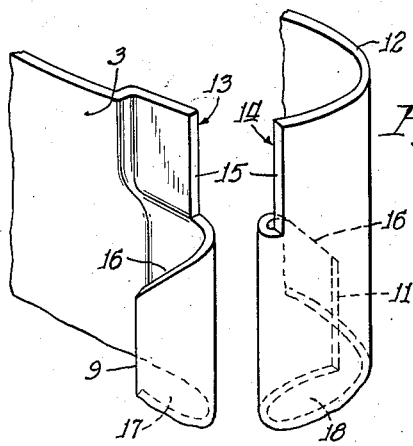
Fig. 5 is a perspective view of the longitudinal edge portions at the end of the tube, such edge portions being illustrated in separated position.

As illustrated in Fig. 4, the longitudinal portions of the strip below the edges 16 are suitably shaped to form a pair of complementary U-shaped channels 17 and 18 which are interlocked to form a common type of lock seam, the latter being positioned within the tube. It will be apparent from a reference to Fig. 4 that the utilization of the U-shaped channels 17 and 18 results in a seam having a total thickness equivalent to four times that of the sheet material, so that under typical production operations, a comparatively large depression 21 results at the external joint formed by the lock seam. It will be readily appreciated that if the lock seam were extended to the end of the tube and thus extended through the aperture 4 in the header member 5, a comparatively large opening or passage would result which would have to be filled with bonding material in order to produce a fluid tight connection between the tube and header member.

Figure 2:
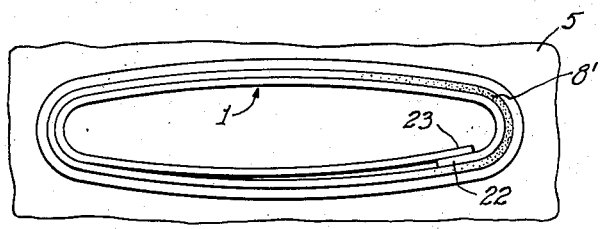
Fig. 2 is a top plan view of the structure illustrated in Fig. 1 prior to the final forming operation.
Figure 3:
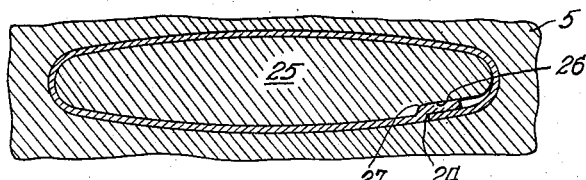
Fig. 3 is a sectional view taken approximately on the line 3—3 of Fig. 1 immediately following the final forming operation and prior to the removal of the forming die or tool from the tube.

The notches 13 and 14 are of such size that the material remaining adjacent the edges 15 is merely sufficient to provide a simple overlap between the longitudinal edges at the end 3 of the tube as illustrated in Fig. 2, so that the joint adjacent the aperture 4 comprises only two overlapping portions 22 and 23 of strip material. As illustrated in Fig. 3, the innermost overlapping portion 23 in the completed tube is inwardly offset the thickness of the sheet material, whereby the outermost portion 22 is in alignment with the tube side wall associated with the inner portion 23, thus forming a lap joint which is flush with the external surface and configuration of the tube. It will be particularly noted that as only two thicknesses of material are involved in the lap joint, the offset 24 forming little if any depression or groove which must be filled by bonding material.

In production operations the tube may be initially formed as illustrated in Figs. 2 and 4, with the overlapping portions 22 and 23 assuming the positions illustrated in Fig. 2, enabling the ready insertion of the end 3 of the tube through the aperture 4, the tube being normally inserted in the aperture with the lock seam terminating substantially at the bottom of the depression 7. Following the insertion of the tube in the header member 5, a suitable die member 25 may be inserted in the adjacent end of the tube, the die member being of a size and shape to closely conform the tube to the periphery of the aperture 4 and may be provided with a recess 26 of a size to accommodate the inner overlapping portion 23, such recess having a shoulder 27 operative to form the offset 24 and provide a tight abutting relation between the respective edge 15 and such offset. Following such operation the bonding material may be suitably deposited in the depression 7 and, as indicated at 8, to efficiently secure the tube to the header in fluid tight relation, in which case the structure would normally be inverted to that illustrated in Fig. 1 during the bonding operation.

While I have illustrated only a single tube and aperture in the header member, commercial structures normally would embody a plurality of such tubes which would be secured in the same manner to the header member, and in practicing the method herein shown and described a plurality of tubes would normally be inserted in the header sheet, following which a multiple die could be employed to simultaneously conform all of the tube ends to their respective apertures in the manner illustrated in Fig. 3.

The edges 16' preferably extend angularly rearward with respect to the edge 12 of the tube to insure accurate assembly and formation of the lap joint, compensating for any manufacturing tolerances and at the same time may serve to direct bonding material into the joint to insure proper connection between the respective members.

While the invention is relatively quite simple in construction and utilization, a very durable and efficient connections between a seamed tube and header member is produced.

While the step of forming the flush lap joint has been illustrated and described as following the insertion of the tube into the header sheet, in some applications of the tube, the latter may initially be formed in its final shape prior to its engagement and connection to another member, the present method, however, insuring a close, accurate fit between the header member and tube throughout their contacting portions. Likewise, it will be apparent from the above disclosure that while I have illustrated the lap joint as being formed only on one end of the tube, in most applications the offset end of the tube would be formed in a similar manner, whereby the tubes extend between two header members.

Having thus described by invention, it is obvious that various immaterial modifications may be made in the same without departing from the spirit of my invention; hence, I do not wish to be understood as limiting myself to the exact form construction, arrangement and combination of parts and method herein shown and described, or uses mentioned.

What I claim as new and desire to secure by Letters Patent is:

1. In a header and seamed tube assembly for a heat exchanger, the combination of a header member having an aperture therein, a flattened seamed tube comprising a strip of sheet material shaped to form a tubular body having a longitudinally extending joint formed by the longitudinal edges of the sheet at an edge of the tube, said edges being bent to provide complemental interlocking U-shaped channels forming a lock seam of four thicknesses of material, said lock seam extending inwardly with respect to the tube side wall, said strip having notches therein at the juncture of the longitudinal edges and an end edge whereby said U-shaped channels terminate at points spaced from such end edge, said notches being of a transverse width to provide a simple overlap of material along the longitudinal edges of said notches, with the side walls of the tube having its external surface of substantialy uniform cross sectional configuration throughout the length of the tube, the transverse edges of said notches extending angularly rearward with respect to said end edge of the tube, said end of the tube being positioned in and closely conforming to the aperture in said header member, the latter being deformed adjacent the periphery of said aperture to axially offset such periphery with respect to the plane of the header member in a direction toward the adjacent tube end, forming an annular depression in the opposite face of said member about said tube, the latter being positioned in said aperture with said lock seam terminating substantially at the bottom of said depression, and bonding material positioned in said depression operative to secure the header member and tube in fluid tight relation.

2. A seamed heat exchanger tube for affixing to a header of a heat exchanger comprising a strip of sheet material shaped to form a tubular body having a longitudinally extending joint formed by the longitudinal edges of the sheet, said edges being bent to provide complemental interlocking U-shaped channels forming a lock seam of four thicknesses of material, said lock seam extending inwardly with respect to the tube side wall, said strip having notches therein at the juncture of the longitudinal edges and an end edge whereby said U-shaped channels terminate at points spaced from such end edge, said notches being of a transverse width to provide a simple overlap of material along the longitudinal edges of said notches, the transverse edges of the latter extending angularly rearward with respect to said end edge of the tube, the innermost portion being inwardly offset whereby the lap joint thus formed is flush with the external surface of the tube for affixing to an opening in the header complementally formed to receive the end of the tube at the lap joint, and such external surface is substantially uniform in cross sectional configuration throughout its length.

References Cited in the file of this patent

UNITED STATES PATENTS

| | | |
|---|---|---|
| 232,259 | Graham | Sept. 14, 1880 |
| 988,083 | Ellis | Mar. 28, 1911 |
| 1,435,010 | Lachman | Nov. 7, 1922 |
| 1,989,614 | Halpern | Jan. 29, 1935 |
| 2,137,097 | Sateven | Nov. 15, 1938 |
| 2,233,549 | O'Neil | Mar. 4, 1941 |
| 2,291,941 | Bachini | Aug. 4, 1942 |
| 2,483,412 | Harker | Oct. 4, 1949 |
| 2,685,306 | Jones | Aug. 3, 1954 |
| 2,727,536 | Tennison | Dec. 20, 1955 |